Dec. 11, 1956          E. GEDDE          2,773,466
METHOD OF SOLDERING CAN BODY SIDE SEAMS
Filed July 22, 1952          2 Sheets-Sheet 1
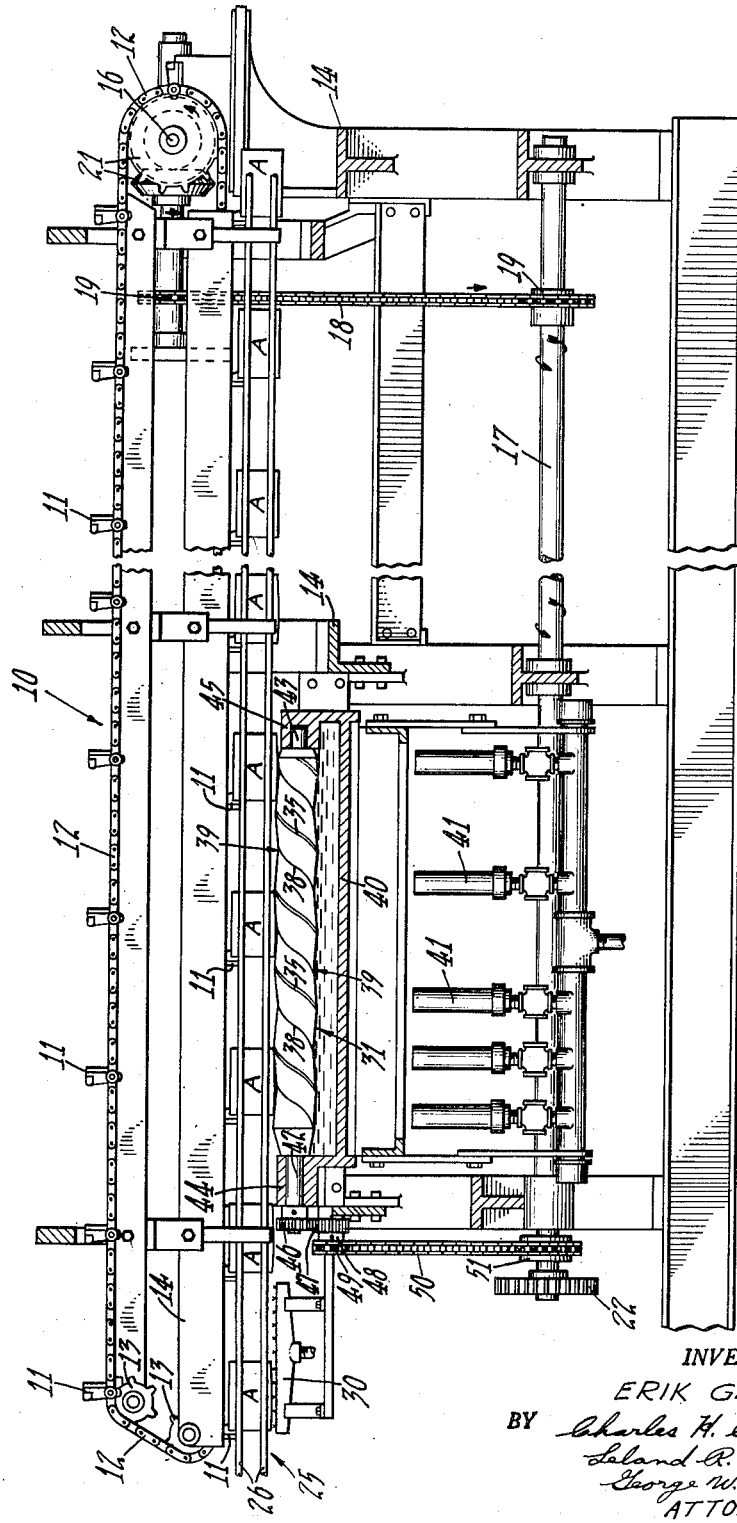
INVENTOR.
ERIK GEDDE
BY Charles H. Erne
Leland R. McCann
George W. Reiber
ATTORNEYS Dec. 11, 1956  E. GEDDE  2,773,466
METHOD OF SOLDERING CAN BODY SIDE SEAMS
Filed July 22, 1952  2 Sheets-Sheet 2
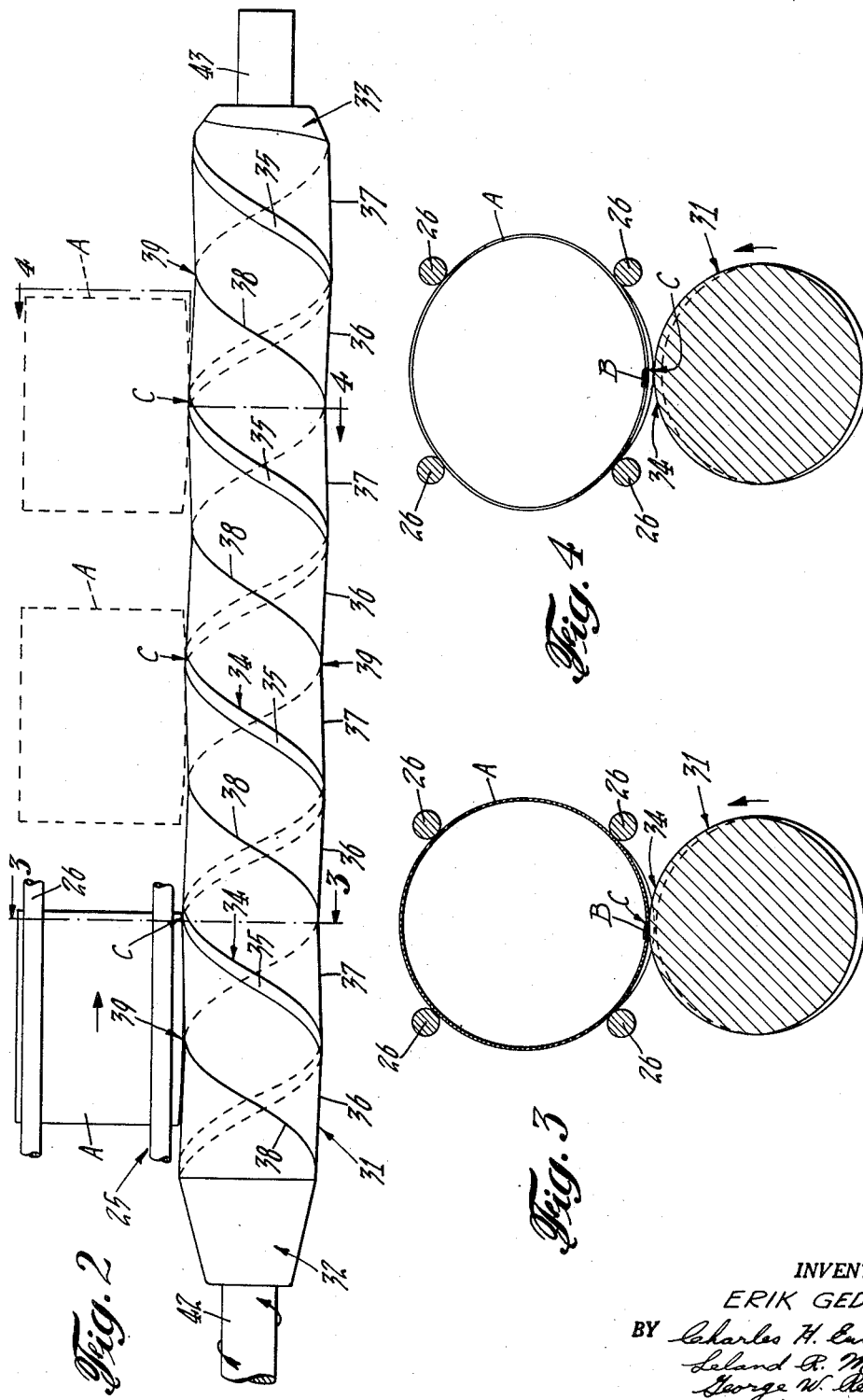
INVENTOR.
ERIK GEDDE
BY Charles H. Cane
Leland R. McCann
George W. Reiger
ATTORNEYS

2,773,466
METHOD OF SOLDERING CAN BODY SIDE SEAMS

Erik Gedde, Park Ridge, Ill., assignor to American Can Company, New York, N. Y., a corporation of New Jersey Application July 22, 1952, Serial No. 300,256

3 Claims. (Cl. 113—120)

The present invention relates to the soldering of the side seams of can bodies, and more particularly to an improved solder roll formed with a spiral solder applying thread which increases the efficiency of the soldering operation.

In current can manufacture the standard soldering roll is usually formed in the shape of an elongated cylinder, the longitudinal surface of which is provided with a series of equally spaced solder applying crowns or corrugations which are disposed at right angles to the axis of the roll. As each can body is fed longitudinally over the roll with its axis parallel to the axis of the roll, its side seam is brought successively into engagement with the solder applying surface of each crown. There is thus provided a series of successive applications of solder, the total number of which is equal to the number of crowns in the roll.

As a result of technical progress the speed of the can manufacturing lines has constantly increased. This, coupled with the present tin shortage, which often makes it necessary to use solder having a low tin content to solder untinned can body surfaces, has made the side seaming operation increasingly difficult. In order to meet this situation, the tendency has been to lengthen the solder roll in order to increase the number of solder applying crowns and thus increase the number of solder applications and effect a better soldering operation. While this lengthening of the solder roll does provide better soldering conditions, it does not furnish a completely satisfactory solution to the problem for it makes it necessary to increase the length of the soldering machine which in turn raises the problem of providing additional floor space, which very often is at a premium. Then too, the longer solder roll is more expensive, and cannot be installed in existing soldering machines unless such machines undergo major reconstruction.

The present invention overcomes these problems by providing a solder roll of such increased efficiency that the need for a lengthened roll is obviated. This increased efficiency is obtained by providing the solder roll with a spiral solder applying thread and rotating the roll so that the solder applying spot on the spiral thread is caused to move counter to or against the direction of travel of the can bodies thus causing the spiral thread to travel repeatedly along the side seam from the leading edge of the body to the trailing edge to thereby increase the number of solder applications and consequently provide a better soldering operation. The lead or pitch of the spiral thread is preferably made greater than the length of the individual can bodies, so that each body never substantially contacts more than one turn of the thread at any one time. This single contact between the can body and the thread is an important factor in attaining a completely soldered side seam, since it insures that the side seam will maintain a uniform contact with the spiral thread throughout its full length, even though the seam be bowed outwardly due to the heat incident to the soldering operation.

An object of the invention, therefore, is the provision of a comparatively short solder roll of increased efficiency to permit an increase in the operating speed of the soldering machine.

Another object is to provide a spiral solder roll which is so rotated that the solder applying spot on its thread moves in a direction opposite to that of the can bodies in order to multiply the number of times the thread traverses the side seams of the bodies and thus increase the amount of solder and heat applied to the seams.

Still another object is to provide a soldering machine in which a closely confined can body is enabled to flex sufficiently, because of its single spot contact with a spiral solder roll, to insure that its outwardly bowed side seam remains in uniform soldering contact with the solder roll throughout the full length of the seam.

Numerous other objects and advantages of the invention will be apparent as it is better understood from the following description, which, taken in connection with the accompanying drawings, discloses a preferred embodiment thereof.

The term "spiral" is used throughout this specification and the claims which follow as synonymous with "helical" in referring to the form of the solder roll thread.

Referring to the drawings:

Figure 1 is a side elevation of a can body side seam soldering machine embodying the present invention, parts being broken away and parts being shown in section;

Fig. 2 is an enlarged side elevation of a spiral soldering roll embodying the present invention, a portion of the outside soldering horse also being shown with a can body positioned therein, the body moving to the right being shown in dotted lines in successive positions with respect to the spiral solder applying thread;

Fig. 3 is an enlarged cross-sectional view taken substantially along the line 3—3 in Fig. 2; and Fig. 4 is an enlarged cross-sectional view taken substantially along the line 4—4 in Fig. 2, the can body which is shown in dotted lines in Fig. 2 being shown in full lines in this figure.

As a preferred or exemplary embodiment of the present invention, Fig. 1 illustrates a can body side seam soldering machine 10 of the type and general construction disclosed in United States Patent 1,338,716 issued to Magnus E. Widell on May 4, 1920, and entitled "Soldering Machine." In soldering machine 10, the tubular can bodies A having their interlocked side seams B disposed in lowermost position are received in spaced processional order from a bodymaker (not shown). The cans upon entering the soldering machine 10 are grasped by gripper dogs or clamps 11 mounted on an endless chain 12 which conveys them through the soldering machine from left to right, as viewed in Fig. 1. The endless chain 12 at the entrance end of the machine 10 operates over a pair of small idler sprockets 13 mounted in the machine main frame 14, and is driven in a counterclockwise direction (as viewed in Fig. 1) by a large driving sprocket 15 secured to a short shaft 16 which is mounted on the main frame 14 at the discharge end of the machine. The sprocket 15 is driven from the main drive shaft 17 of the soldering machine 10 through an endless chain 18 and a pair of associated sprockets 19 which transmit the motion of the drive shaft 17 to a short shaft 20, which in turn drives the shaft 16 through a pair of bevel gears 21. The main drive shaft 17 is driven from any suitable source of power (not shown) through a large drive gear 22.

As the can bodies A enter the soldering machine 10, they are received in a skeleton type of outside solder horse 25, which guides them through the machine along a straight line path of travel. The solder horse 25 is composed of a suitable number of guide rails 26, four being shown in the present drawings, which are mounted on the main frame 14, and which engage around the periphery of the bodies A and closely confine the same.

The entering can bodies A pass first over a suitable preheater 30, shown here as a gas burner, which heats the bodies A to prepare the side seams B for soldering. As the bodies A are heated, the side seams B bow outwardly and assume a longitudinally convex shape (see Figs. 1, 2) due in large part to the uneven expansion of the metal of the seams as they are heated only on their exterior surfaces.

After passing over the preheater 30, the can bodies A are conveyed by the feed chain 12 over a rotating solder applying roll 31 which applies molten solder to their side seams B. The solder roll 31 (see Fig. 2) is formed approximately in the shape of an elongated cylinder having its ends bevelled as at 32, 33. The longitudinal surface of the roll 31 is formed in the shape of a helical or spiral ridge, projection or thread 34 having a long lead or pitch which is preferably greater and never substantially less than the length of the can bodies A. The spiral thread 34 is formed with a narrow face, crown, or land 35 which merges at each side into oppositely inclined walls 36, 37. The face or crown 35 is preferably flat, but may be slightly rounded if desired. The walls 36, 37 of adjacent turns of the spiral thread 34 meet along the spiral line 38 to form a shallow spiral trough or depression, generally designated by the numeral 39.

The solder roll 31 is immersed in a solder bath or reservoir 40 which contains a supply of solder which is maintained in a molten state by the application of heat from a series of gas burners 41 and is carried upwardly in a thin film into contact with the side seam B by the solder roll 31. The solder roll 31 is formed with a pair of trunnions 42, 43 which are journaled in bearings 44, 45 formed in the reservoir 40. Trunnion 42 projects beyond its bearing 44 and carries a small spur gear 46 which meshes with a second spur gear 47 keyed to one end of a short shaft 48. A sprocket 49 is keyed to the other end of shaft 48 and is connected to the main drive shaft 17 by an endless chain 50 which also operates around a larger sprocket 51 keyed to the main shaft 17.

Thus, as the main shaft 17 rotates to drive the conveyor chain 12 and carry the can bodies A across the solder roll 31, it also rotates in synchronism with the solder roll in a counterclockwise direction (as seen in Figs. 3 and 4) which moves the spiral thread 34 in a direction opposite to the movement of the bodies so that the spiral thread 34 repeatedly traverses the side seams B from their leading edges to their trailing edges as they move across the roll 31.

Since the lead of the spiral thread 34 is long, preferably greater than the length of a can body A, each side seam B substantially contacts only one turn of the thread 34 adjacent its crown 35 at any one time during its movement across the roll. This small area or spot of contact which is concentrated at the crown 35 of the spiral 34 and/or at the portions of the inclined walls 36, 37 closely adjacent thereto, constitutes the localized area of application of solder to the side seam B, and is designated by the letter C. In the normal operation of the soldering machine, the counterclockwise rotation of the solder roll 31 and the forward movement of each can body causes this area of application C to traverse the side seam B from its leading edge to its trailing edge. As the area C passes from the trailing edge of the body, the body becomes positioned momentarily in the trough 39. The leading edge of the body then makes contact again with the thread 34 at or closely adjacent its crown 35 and a second area of contact C moves backwardly along the side seam. This process is repeated for the total length of time the body is positioned over the roll. Thus the soldering action of the solder roll 31 is, in effect, a series of rapid individual wiping or scrubbing actions of the solder applying thread 34 along the seam B.

As a concrete example of how the rotation of the spiral thread in a direction counter to the motion of the can bodies A multiplies the number of individual soldering applications, assume that the solder roll 31 shown in Fig. 2, which is formed with 4 full turns of the spiral thread 34, is rotated at 180 R. P. M. or 3 revolutions per second. If each can body remains in soldering contact with the roll for 1 second, which may be considered as normal, the number of soldering applications, as determined by multiplying the 4 turns of the spiral by the 3 rotations the roll makes during the second, will be 12 per second. If the solder roll 31 be run at the rate of 120 R. P. M. the thread 34 will make 8 soldering runs per second along each seam.

The reason for limiting the contact between the side seam B and the spiral thread 34 to a single area C is to insure full contact between the seam and the thread for the whole length of the seam. This can best be explained by referring to Figs. 2, 3 and 4. As previously explained, each side seam B bows downwardly intermediate its ends because of the heat necessary for the soldering operation. When the portion of the seam B immediately adjacent its leading or trailing end is in contact with the thread 34, as best seen in Fig. 3, the central portion of the seam extends into the trough 39 below the level of the thread face 35. As the area of application C moves along the bowed seam towards its center, the pressure of the thread 34 causes the can body A, which is closely confined by the solder horse rails 26 and thus prevented moving bodily away from the solder roll 31, to flex or flatten slightly in a horizontal direction, thus lifting the ends of the side seam B above the level of the solder applying thread 34. This can be clearly seen in Fig. 4 and in the dotted representations of the can bodies in Fig. 2. If the lead of the thread 34 were substantially less than the length of the can bodies, some portion of the bowed side seam intermediate the ends of the body would always be in contact with the thread 34 at or near its crown 35 and thus the end portions of the seam would always remain above the level of the thread 34 and out of soldering contact with it, thereby preventing these portions from receiving sufficient solder. However, under some circumstances, as for instance, when the side seam is only slightly bowed outwardly, it may be permissible to have the lead of the spiral thread 34 substantially equal to the length of the can bodies A.

During the soldering operation, the solder horse 25 maintains the axis of the can body substantially parallel to the axis of the spiral solder applying thread 34. This prevents the rocking of the body as it is conveyed along the solder applicator and thus insures continuous and substantially uniform contact between the thread 34 and the can body side seam during each seam traversal.

In the present embodiment of the invention, it is possible for the side seam to momentarily contact portions of both walls 36 and 37 when the body is centralized between two turns of the thread 34. This does not detrimentally affect the soldering action of the thread, however, since in this position the ends of the body will not be above the level of the crown 35 of the thread 34 and the gentle inclination of these walls 36, 37 permits the bodies to smoothly engage the next turn of the crown.

After the can bodies have passed over the solder applying roll 31, they continue their movement through the soldering machine 10, passing in turn through a wiping station (not shown) and a solder cooling station (not shown) and are then discharged to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The method of soldering the side seams of can bodies with a rotating spiral solder applicator having a long lead, greater than the length of the individual can bodies, said side seams being subject to bowing by the heat applied thereto incidental to soldering, which method comprises the steps of advancing can bodies in processional order with their side seams in substantially longitudinal alignment while maintaining the axes of said can bodies parallel to the axis of said spiral solder applicator, applying solder to each side seam with only a single spot of the rotating spiral applicator in solder applying contact with the seam at any time, said spot of solder application being moved along the seam in a direction opposite to said advancement of the can bodies, whereby successive spot applications of solder traverse each side seam from its leading to its trailing edge at a said single spot thereby assuring full contact between said applicator and said seam throughout each of said successive applications whether the seam is bowed or not.

2. The method of soldering the side seams of cam bodies with a rotating spiral solder applicator having a long lead, greater than the length of the individual can bodies, said side seams being subject to bowing by the heat applied thereto incidental to soldering, which method comprises the steps of advancing can bodies in processional order with their side seams in longitudinal alignment, supporting the advancing can bodies opposite their side seams, applying solder to each side seam with sufficient pressure to flex each body slightly and with only a single spot of the rotating spiral applicator in solder applying contact with the seam at any time, said spot of solder application being moved along the seam in a direction opposite to said advancement of the can bodies, whereby successive applications of solder traverse each side seam from its leading to its trailing edge at a said single spot thereby assuring full contact between said applicator and said seam throughout each of said successive applications whether the seam is bowed or not.

3. The method of soldering a normally flat side seam of a can body with a cylindrical solder applicator formed with a helical solder applying thread having a lead at least as great as the length of the side seam, the portion of said side seam intermediate its end extremities being subject to longitudinal bowing out of its normal plane by the heat applied thereto incidental to soldering, which method comprises advancing said can body longitudinally along said applicator in a straight path of travel parallel to the axis of said applicator with its side seam in engagement with said helical thread so that said bowed intermediate portion of said side seam contacts only a single spot on said spiral thread at any given time, maintaining the axis of said can body parallel to the axis of said helical thread, and rotating said solder applicator about its axis in the same rotary direction, as viewed in the direction of travel of said can body, as the rotary direction of spiralling of said helical thread about said axis to cause said spiral thread to repeatedly traverse the full length of said side seam from its leading to its trailing edge to thereby apply solder to the seam in a succession of spot applications which are continuous and substantially uniform throughout the full length of said seam.

References Cited in the file of this patent

UNITED STATES PATENTS

| | | |
|---|---|---|
| 1,223,557 | Cameron | Apr. 24, 1917 |
| 1,476,405 | Kronquest | Dec. 4, 1923 |
| 1,666,707 | Kronquest | Apr. 17, 1928 |
| 2,109,800 | O'Neil | Mar. 1, 1938 |
| 2,148,218 | Prince | Feb. 21, 1939 |
| 2,294,422 | Reid | Sept. 1, 1942 |

FOREIGN PATENTS

| | | |
|---|---|---|
| 388,075 | Germany | Jan. 8, 1924 |